(12) United States Patent
Marggraff et al.

(10) Patent No.: US 8,416,218 B2
(45) Date of Patent: Apr. 9, 2013

(54) CYCLICAL CREATION, TRANSFER AND ENHANCEMENT OF MULTI-MODAL INFORMATION BETWEEN PAPER AND DIGITAL DOMAINS

(75) Inventors: Jim Marggraff, Lafayette, CA (US); Tracy L. Edgecomb, Berkeley, CA (US)

(73) Assignee: Livescribe, Inc., Oakland, CA (US)

( * ) Notice: Subject to any disclaimer, the term of this patent is extended or adjusted under 35 U.S.C. 154(b) by 943 days.

(21) Appl. No.: 12/129,193

(22) Filed: May 29, 2008

(65) Prior Publication Data
US 2009/0021493 A1    Jan. 22, 2009

Related U.S. Application Data

(60) Provisional application No. 60/940,663, filed on May 29, 2007.

(51) Int. Cl.
*G06F 3/033* (2006.01)
(52) U.S. Cl.
USPC ............ 345/179; 382/186; 715/727; 715/512
(58) Field of Classification Search .................. 345/179; 382/173, 181
See application file for complete search history.

(56) References Cited

U.S. PATENT DOCUMENTS

| | | | |
|---|---|---|---|
| 5,897,648 A * | 4/1999 | Henderson | 715/210 |
| 7,111,230 B2 * | 9/2006 | Euchner et al. | 715/232 |
| 7,175,095 B2 | 2/2007 | Pettersson et al. | |
| 7,281,664 B1 | 10/2007 | Thaeler et al. | |
| 7,424,129 B2 * | 9/2008 | Hull et al. | 382/100 |
| 7,502,509 B2 * | 3/2009 | Sheets et al. | 382/186 |
| 2002/0126105 A1 * | 9/2002 | O'Donnell, Jr. | 345/179 |
| 2004/0085301 A1 * | 5/2004 | Furukawa et al. | 345/179 |
| 2004/0229195 A1 | 11/2004 | Marggraff et al. | |
| 2005/0022122 A1 | 1/2005 | Barrus et al. | |
| 2006/0033725 A1 | 2/2006 | Marggraff et al. | |
| 2006/0066591 A1 | 3/2006 | Marggraff et al. | |
| 2006/0067576 A1 | 3/2006 | Marggraff et al. | |
| 2006/0067577 A1 | 3/2006 | Marggraff et al. | |
| 2006/0077184 A1 | 4/2006 | Marggraff et al. | |
| 2006/0078866 A1 | 4/2006 | Marggraff et al. | |
| 2006/0080608 A1 * | 4/2006 | Marggraff et al. | 715/727 |

(Continued)

FOREIGN PATENT DOCUMENTS
WO    WO 2007/141204 A1    12/2007

OTHER PUBLICATIONS

PCT International Search Report and Written Opinion, PCT/US 08/65147, Sep. 2, 2008, 8 pages.

*Primary Examiner* — Alexander S Beck
*Assistant Examiner* — Amen Bogale
(74) *Attorney, Agent, or Firm* — Fenwick & West LLP

(57) ABSTRACT

In a pen-based computing system, multi-modal data is transferred between a paper domain and a digital domain. Data initially generated in the paper domain is captured by a smart pen and a digital file including the captured data is generated. For example, a computing system coupled to the smart pen generates a digital file including the captured data. A paper representation of the digital file is subsequently generated. The digital file can subsequently be modified by editing the paper representation of the digital file using the smart pen. Edits to the paper representation of the digital file are captured by the smart pen and converted to the digital domain where they are used to edit the content of the digital file.

10 Claims, 3 Drawing Sheets

U.S. PATENT DOCUMENTS

| | | |
|---|---|---|
| 2006/0080609 A1 | 4/2006 | Marggraff et al. |
| 2006/0125805 A1 | 6/2006 | Marggraff et al. |
| 2006/0127872 A1 | 6/2006 | Marggraff et al. |
| 2006/0156234 A1* | 7/2006 | Takahashi et al. ............ 715/541 |
| 2006/0159345 A1* | 7/2006 | Clary et al. ................... 382/186 |
| 2006/0292543 A1 | 12/2006 | Marggraff et al. |
| 2007/0011140 A1 | 1/2007 | King et al. |
| 2007/0086654 A1* | 4/2007 | James .......................... 382/186 |
| 2007/0097100 A1 | 5/2007 | Marggraff et al. |
| 2007/0143663 A1 | 6/2007 | Hansen et al. |
| 2007/0280627 A1 | 12/2007 | Marggraff et al. |
| 2009/0127006 A1* | 5/2009 | Lynggaard ................. 178/19.01 |

* cited by examiner

CYCLICAL CREATION, TRANSFER AND ENHANCEMENT OF MULTI-MODAL INFORMATION BETWEEN PAPER AND DIGITAL DOMAINS

CROSS REFERENCE TO RELATED APPLICATIONS

This application claims the benefit of U.S. Provisional Application No. 60/940,663, filed May 29, 2007, which is incorporated by reference in its entirety.

BACKGROUND

This invention relates generally to pen-based computing systems, and more particularly to creating, transferring, and enhancing data between a paper domain and a digital domain.

Various combinations of hardware and software tools allow for the creation of documents and information in a digital domain (e.g., using a personal computer, a PDA, and many other computing devices) as well as in the paper domain (e.g., written on paper). Documents and other information created in the digital domain may be multi-modal. For example, digital documents may include text, digital ink (drawn on a screen), audio, animations, and/or various combinations thereof.

Documents created and edited in the paper domain may also be multi-modal. For example, a document in the paper domain may include writing as well as associated audio. This might be accomplished by a system that captures and combines writing and audio content, such as a standalone digital recorder and a digital pen having an input. In another example, a document created in the paper domain may simply include a time component to the writing content, which may be used to generate a replay animation of the writing as it was entered in real time.

As multi-modal information may be created in either the digital or the paper domain, multi-modal information can also be transferred between the two domains. For example, text composed in the digital domain may be printed on one or more sheets of paper. In another example, text with associated audio may be printed on a sheet of paper, and the audio may be delivered into a platform for access in the paper domain (such as the LeapPad™ provided by LeapFrog or point-and-click pens found in Japan and China). In an example of transferring data from paper domain to digital domain, ink drawn in the paper domain may be transferred to a personal computer as digital ink (such as a standard input pen provided by Logitech). Audio may then be transferred to the digital domain—i.e., recorded—and manually associated with the digital ink.

Although it is possible to transfer multi-modal information between the paper and digital domains, this process is rarely automated and typically does not allow for useful transfer between the domains more than once. One of the problems with existing systems is that multi-modal information that is useful in one of the domains is often lost when that information is transferred to the other domain. In part because of this limitation, there is no seamless, low-cost, or easy-to-use system which supports on-going cyclical transfer of multi-modal information for a single document or "information carrier" between the paper and digital domains that allows for creation and/or enhancement of this information in each domain.

Accordingly, there is a need for techniques that enable the cyclical creation, transfer, and enhancement of multi-modal information back and forth between the paper and digital domains multiple times.

SUMMARY

In a pen-based computing system, multi-modal data is transferred between a paper domain and a digital domain. Data initially generated in the paper domain is captured by a smart pen and a digital file including the captured data is generated. For example, a computing system coupled to the smart pen generates a digital file including the captured data. A paper representation of the digital file is subsequently generated (e.g., via printing the digital file onto paper). The digital file can subsequently be modified by editing the paper representation of the digital file using the smart pen. Edits to the paper representation of the digital file are captured by the smart pen and converted to the digital domain, where they are used to edit the content of the digital file.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview of Pen-Based Computing System

Figure 1:
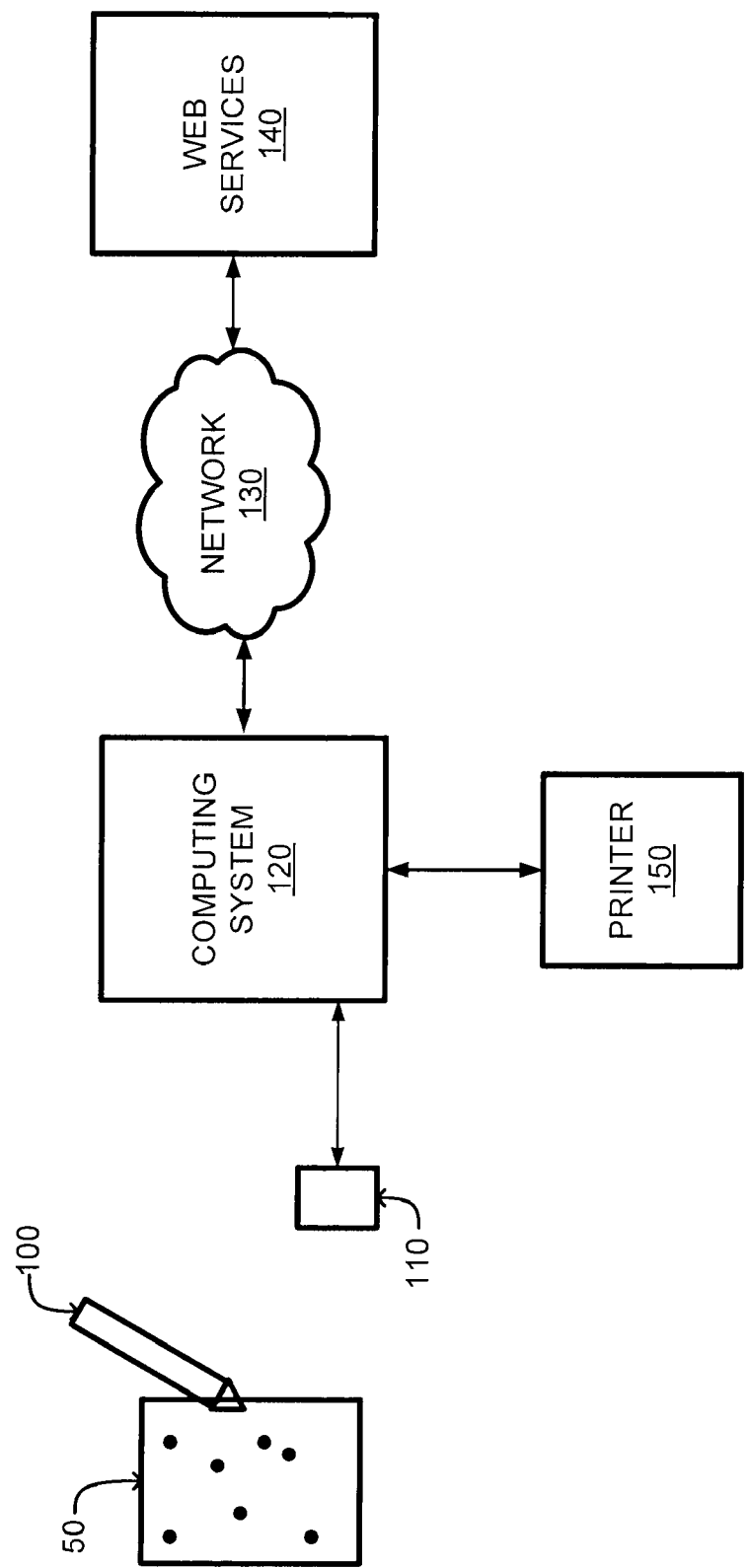
FIG. 1 is a schematic diagram of a pen-based computing system, in accordance with an embodiment of the invention.

Embodiments of the invention may be implemented on various embodiments of a pen-based computing system, an example of which is illustrated in FIG. 1. In this embodiment, the pen-based computing system comprises a writing surface 50, a smart pen 100, a docking station 110, a client system 120, a network 130, and a web services system 140. In an embodiment, the pen-based computing system also includes a printer 150. The smart pen 100 includes onboard processing capabilities as well as input/output functionalities, the pen-based computing system expands the screen-based interactions of traditional computing systems to other surfaces on which a user can write. For example, the smart pen 100 may be used to capture electronic representations of writing as well as record audio during the writing, and the smart pen 100 may also be capable of outputting visual and audio information back to the user. With appropriate software on the smart pen 100 for various applications, the pen-based computing system thus provides a new platform for users to interact with software programs and computing services in both the digital and paper domains. Hence, the pen-based computing system allows for multi-modal information to be created, enhanced and transferred between the digital and paper domains multiple times.

The modalities referred to in various embodiments of the invention may include a variety of types of information that can be generated and modified in either the paper domain or the digital domain. This information may include one or more of the following, without limitation: writing content, which may be static or may include an associated time component; static image content, audio content, video content, data (which includes information that may be represented in the paper or digital domains in different formats), sensed motion and any other type of content that can be created, modified or otherwise used in the paper and/or digital domain.

In the pen based computing system, the smart pen 100 provides input and output capabilities for the computing system and performs some or all of the computing functionalities of the system. Hence, the smart pen 100 enables user interaction with the pen-based computing system using multiple modalities. In one embodiment, the smart pen 100 receives input from a user, using multiple modalities, such as capturing a user's writing or other hand gesture or recording audio, and provides output to a user using various modalities, such as displaying visual information or playing audio. In other embodiments, the smart pen 100 includes additional input modalities, such as motion sensing or gesture capture, and/or additional output modalities, such as vibrational feedback.

Figure 2:
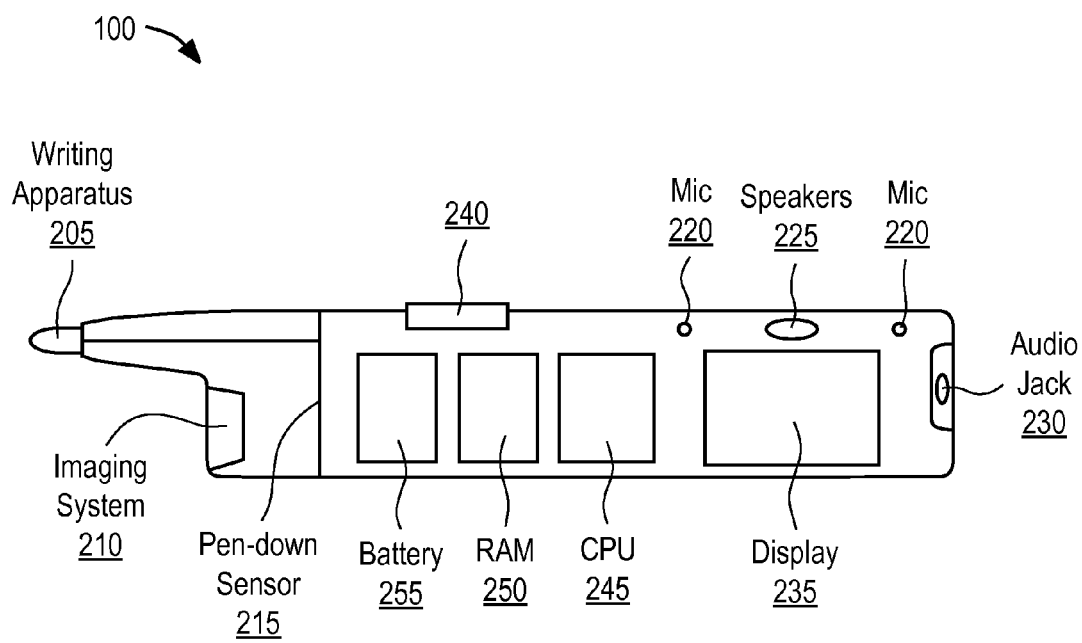
FIG. 2 is a diagram of a smart pen for use in the pen-based computing system, in accordance with an embodiment of the invention.

The components of a particular embodiment of the smart pen 100 are shown in FIG. 2 and described in more detail in the accompanying text. The smart pen 100 preferably has a form factor that is substantially shaped like a pen or other writing implement, although certain variations on the general shape may exist to accommodate other functions of the pen, or may even be an interactive multi-modal non-writing implement. For example, the smart pen 100 may be slightly thicker than a standard pen so that it can contain additional components, or the smart pen 100 may have additional structural features (e.g., a flat display screen) in addition to the structural features that form the pen shaped form factor. Additionally, the smart pen 100 may also include any mechanism by which a user can provide input or commands to the smart pen computing system or may include any mechanism by which a user can receive or otherwise observe information from the smart pen computing system.

The smart pen 100 is designed to work in conjunction with the writing surface 50 so that the smart pen 100 can capture writing that is made on the writing surface 50. In one embodiment, the writing surface 50 comprises a sheet of paper (or any other suitable material that can be written upon) and is encoded with a pattern that can be read by the smart pen 100. An example of such a writing surface 50 is the so-called "dot-enabled paper" available from Anoto Group AB of Sweden (local subsidiary Anoto, Inc. of Waltham, Mass.), and described in U.S. Pat. No. 7,175,095, incorporated by reference herein. This dot-enabled paper has a pattern of dots encoded on the paper. A smart pen 100 designed to work with this dot enabled paper includes an imaging system and a processor that can determine the position of the smart pen's writing tip with respect to the encoded dot pattern. This position of the smart pen 100 may be referred to using coordinates in a predefined "dot space," and the coordinates can be either local (i.e., a location within a page of the writing surface 50) or absolute (i.e., a unique location across multiple pages of the writing surface 50).

In other embodiments, the writing surface 50 may be implemented using mechanisms other than encoded paper to allow the smart pen 100 to capture gestures and other written input. For example, the writing surface may comprise a tablet or other electronic medium that senses writing made by the smart pen 100. In another embodiment, the writing surface 50 comprises electronic paper, or e-paper. This sensing may be performed entirely by the writing surface 50 or in conjunction with the smart pen 100. Even if the role of the writing surface 50 is only passive (as in the case of encoded paper), it can be appreciated that the design of the smart pen 100 will typically depend on the type of writing surface 50 for which the pen based computing system is designed. Moreover, written content may be displayed on the writing surface 50 mechanically (e.g., depositing ink on paper using the smart pen 100), electronically (e.g., displayed on the writing surface 50), or not at all (e.g., merely saved in a memory). In another embodiment, the smart pen 100 is equipped with sensors to sensor movement of the pen's tip, thereby sensing writing gestures without requiring a writing surface 50 at all. Any of these technologies may be used in a gesture capture system incorporated in the smart pen 100.

In various embodiments, the smart pen 100 can communicate with a general purpose computing system 120, such as a personal computer, for various useful applications of the pen based computing system. For example, content captured by the smart pen 100 may be transferred to the computing system 120 for further use by that system 120. For example, the computing system 120 may include management software that allows a user to store, access, review, delete, and otherwise manage the information acquired by the smart pen 100. Downloading acquired data from the smart pen 100 to the computing system 120 also frees the resources of the smart pen 100 so that it can acquire more data. Conversely, content may also be transferred back onto the smart pen 100 from the computing system 120. In addition to data, the content provided by the computing system 120 to the smart pen 100 may include software applications that can be executed by the smart pen 100. Additionally, software and file structures are included that facilitate creation, editing and enhancement of multi-modal information in the paper and/or digital domains, allowing easy and efficient transfer of information between the domains.

The smart pen 100 may communicate with the computing system 120 via any of a number of known communication mechanisms, including both wired and wireless communications. In one embodiment, the pen based computing system includes a docking station 110 coupled to the computing system. The docking station 110 is mechanically and electrically configured to receive the smart pen 100, and when the smart pen 100 is docked the docking station 110 may enable electronic communications between the computing system 120 and the smart pen 100. The docking station 110 may also provide electrical power to recharge a battery in the smart pen 100.

Hence, the smart pen 100 captures written content from the writing surface 50 and converts the written content into the digital domain where it can be digitally represented by the computing system 120. In the digital domain, the information may be enhanced, for example, using a content recognition algorithm to capture the characters or other data written on the writing surface 50. The captured characters or data can be further enhanced by formatting the captured data or characters and incorporating the data or characters into a digital file, such as a text file or a slideshow presentation.

From the digital domain, the data or characters can be transferred back to the paper domain. In an embodiment, the computing system 120 is communicatively coupled to a printer 150 which prints the enhanced content onto paper. In an embodiment, the printer 150 also prints the pattern that can be read by the smart pen 100 on the paper, reconnecting the content from its context in the digital domain with its original context in the paper domain.

FIG. 2 illustrates an embodiment of the smart pen 100 for use in a pen based computing system, such as the embodiments described above. In the embodiment shown in FIG. 2, the smart pen 100 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 100, and this is not an exhaustive list of components for all embodiments of the smart pen 100 or of all possible variations of the above components. For example, the smart pen 100 may also include buttons, such as a power button or an audio recording button, and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 100 is being used to write on a surface.

The imaging system 210 comprises sufficient optics and sensors for imaging an area of a surface near the marker 205. The imaging system 210 may be used to capture handwriting and gestures made with the smart pen 100. For example, the imaging system 210 may include an infrared light source that illuminates a writing surface 50 in the general vicinity of the marker 205, where the writing surface 50 includes an encoded pattern. By processing the image of the encoded pattern, the smart pen 100 can determine where the marker 205 is in relation to the writing surface 50. An imaging array of the imaging system 210 then images the surface near the marker 205 and captures a portion of a coded pattern in its field of view. Thus, the imaging system 210 allows the smart pen 100 to receive data using at least one input modality, such as receiving written input. The imaging system 210 incorporating optics and electronics for viewing a portion of the writing surface 50 is just one type of gesture capture system that can be incorporated in the smart pen 100 for electronically capturing any writing gestures made using the pen, and other embodiments of the smart pen 100 may use any other appropriate means for achieve the same function.

In an embodiment, data captured by the imaging system 210 is subsequently processed, allowing one or more content recognition algorithms, such as character recognition, to be applied to the received data. In another embodiment, the imaging system 210 can be used to scan and capture written content that already exists on the writing surface 50 (e.g., and not written using the smart pen 100). The imaging system 210 may further be used in combination with the pen down sensor 215 to determine when the marker 205 is touching the writing surface 50. As the marker 205 is moved over the surface, the pattern captured by the imaging array changes, and the user's handwriting can thus be determined and captured by a gesture capture system (e.g., the imaging system 210 in FIG. 2) in the smart pen 100. This technique may also be used to capture gestures, such as when a user taps the marker 205 on a particular location of the writing surface 50, allowing data capture using another input modality of motion sensing or gesture capture.

Another data capture device on the smart pen 100 are the one or more microphones 220, which allow the smart pen 100 to receive data using another input modality, audio capture. The microphones 220 may be used for recording audio, which may be synchronized to the handwriting capture described above. In an embodiment, the one or more microphones 220 are coupled to signal processing software executed by the processor 245, or by a signal processor (not shown), which removes noise created as the marker 205 moves across a writing surface and/or noise created as the smart pen 100 touches down to or lifts away from the writing surface. In an embodiment, the processor 245 synchronizes captured written data with captured audio data. For example, a conversation in a meeting may be recorded using the microphones 220 while a user is taking notes that are also being captured by the smart pen 100. Synchronizing recorded audio and captured handwriting allows the smart pen 100 to provide a coordinated response to a user request for previously captured data. For example, responsive to a user request, such as a written command, parameters for a command, a gesture with the smart pen 100, a spoken command or a combination of written and spoken commands, the smart pen 100 provides both audio output and visual output to the user. The smart pen 100 may also provide haptic feedback to the user.

The speaker 225, audio jack 230, and display 235 provide outputs to the user of the smart pen 100 allowing presentation of data to the user via one or more output modalities. The audio jack 230 may be coupled to earphones so that a user may listen to the audio output without disturbing those around the user, unlike with a speaker 225. Earphones may also allow a user to hear the audio output in stereo or full three-dimensional audio that is enhanced with spatial characteristics. Hence, the speaker 225 and audio jack 230 allow a user to receive data from the smart pen using a first type of output modality by listening to audio played by the speaker 225 or the audio jack 230.

The display 235 may comprise any suitable display system for providing visual feedback, such as an organic light emitting diode (OLED) display, allowing the smart pen 100 to provide output using a second output modality by visually displaying information. In use, the smart pen 100 may use any of these output components to communicate audio or visual feedback, allowing data to be provided using multiple output modalities. For example, the speaker 225 and audio jack 230 may communicate audio feedback (e.g., prompts, commands, and system status) according to an application running on the smart pen 100, and the display 235 may display word phrases, static or dynamic images, or prompts as directed by such an application. In addition, the speaker 225 and audio jack 230 may also be used to play back audio data that has been recorded using the microphones 220.

The input/output (I/O) port 240 allows communication between the smart pen 100 and a computing system 120, as described above. In one embodiment, the I/O port 240 comprises electrical contacts that correspond to electrical contacts on the docking station 110, thus making an electrical connection for data transfer when the smart pen 100 is placed in the docking station 110. In another embodiment, the I/O port 240 simply comprises a jack for receiving a data cable (e.g., Mini-USB or Micro-USB). Alternatively, the I/O port 240 may be replaced by a wireless communication circuit in the smart pen 100 to allow wireless communication with the computing system 120 (e.g., via Bluetooth, WiFi, infrared, or ultrasonic).

A processor 245, onboard memory 250, and battery 255 (or any other suitable power source) enable computing functionalities to be performed at least in part on the smart pen 100. The processor 245 is coupled to the input and output devices and other components described above, thereby enabling applications running on the smart pen 100 to use those components. In one embodiment, the processor 245 comprises an ARM9 processor, and the onboard memory 250 comprises a small amount of RAM and a larger amount of flash or other persistent memory. As a result, executable applications can be stored and executed on the smart pen 100, and recorded audio and handwriting can be stored on the smart pen 100, either indefinitely or until offloaded from the smart pen 100 to a computing system 120.

In an embodiment, the smart pen 100 also includes an operating system or other software supporting one or more input modalities, such as handwriting capture, audio capture or gesture capture, or output modalities, such as audio playback or display of visual data. The operating system or other software may support a combination of input modalities and output modalities and manages the combination, sequencing and transitioning between input modalities (e.g., capturing written and/or spoken data as input) and output modalities (e.g., presenting audio or visual data as output to a user). For example, this transitioning between input modality and output modality allows a user to simultaneously write on paper or another surface while listening to audio played by the smart pen 100, or the smart pen 100 may capture audio spoken from the user while the user is also writing with the smart pen 100. Various other combinations of input modalities and output modalities are also possible.

In an embodiment, the processor 245 and onboard memory 250 include one or more executable applications supporting and enabling a menu structure and navigation through a file system or application menu, allowing launch of an application or of a functionality of an application. For example, navigation between menu items comprises a dialogue between the user and the smart pen 100 involving spoken and/or written commands and/or gestures by the user and audio and/or visual feedback from the smart pen computing system. Hence, the smart pen 100 may receive input to navigate the menu structure from a variety of modalities.

For example, a writing gesture, a spoken keyword, or a physical motion, may indicate that subsequent input is associated with one or more application commands. For example, a user may depress the smart pen 100 against a surface twice in rapid succession then write a word or phrase, such as "solve," "send," "translate," "email," "voice-email" or another predefined word or phrase to invoke a command associated with the written word or phrase or receive additional parameters associated with the command associated with the predefined word or phrase. This input may have spatial (e.g., dots side by side) and/or temporal components (e.g., one dot after the other). Because these "quick-launch" commands can be provided in different formats, navigation of a menu or launching of an application is simplified. The "quick-launch" command or commands are preferably easily distinguishable during conventional writing and/or speech.

Alternatively, the smart pen 100 also includes a physical controller, such as a small joystick, a slide control, a rocker panel, a capacitive (or other non-mechanical) surface or other input mechanism which receives input for navigating a menu of applications or application commands executed by the smart pen 100.

Creation, Transfer and Enhancement of Multi-Modal Information

Figure 3:
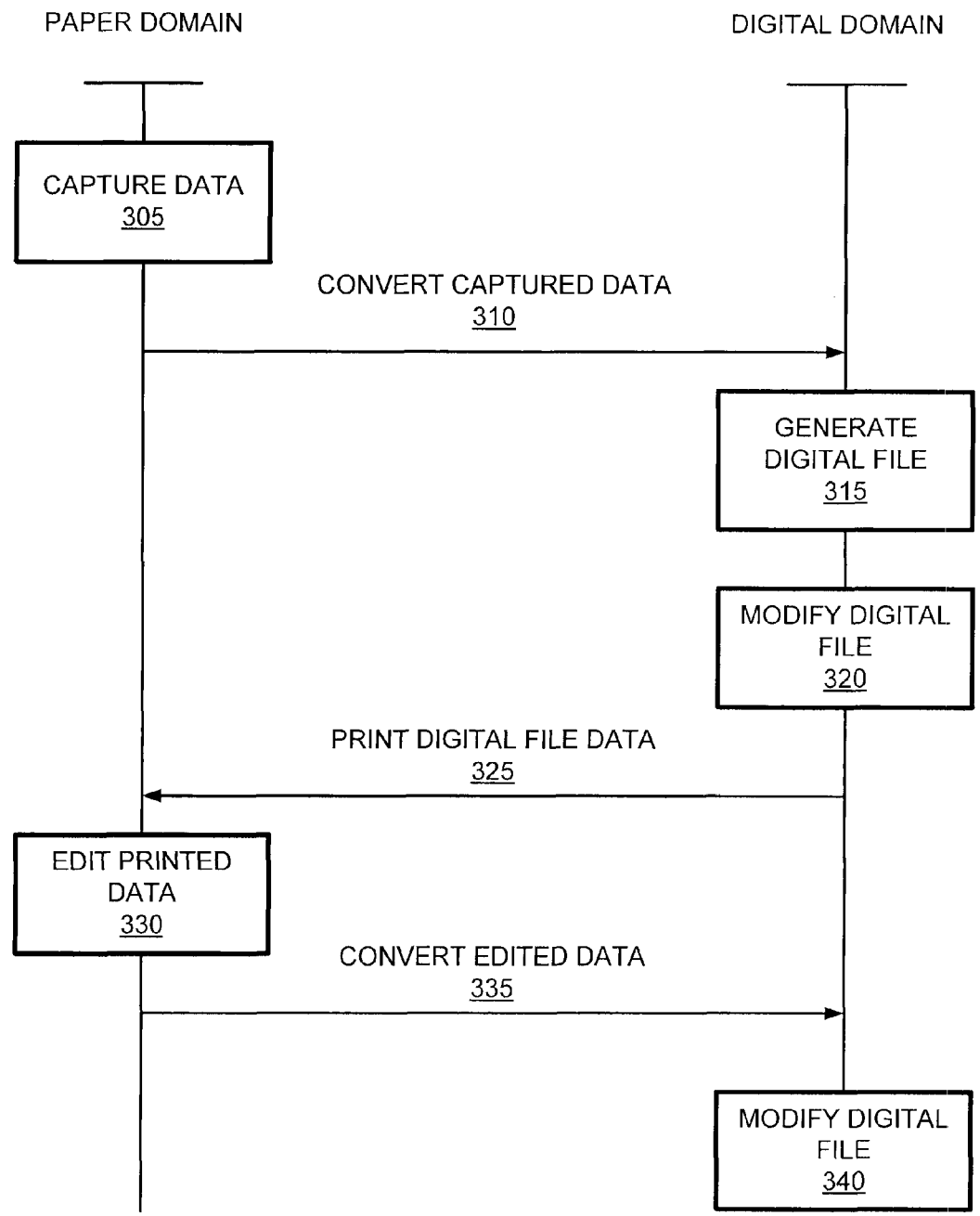
FIG. 3 is an event diagram of the transfer and enhancement of information between the paper domain and the digital domain in accordance with an embodiment of the invention.

FIG. 3 is an event diagram of the transfer and enhancement of information between the paper domain and the digital domain in accordance with an embodiment of the invention. Those of skill in the art will recognize that other embodiments can perform the steps of FIG. 3 in different orders. Moreover, other embodiments can include different and/or additional steps than the ones described here.

Initially, data in the paper domain is captured 305 by a smart pen 100. For example, the imaging system 210 of the smart pen 100 captured handwriting data made with the smart pen. The captured data is then converted 310 into the digital domain, creating a digital representation of the captured data. In one embodiment, conversion 310 into the digital domain includes transmitting the captured data from the smart pen 100 to a computing system 120.

A digital file, such as a text file, document, slideshow presentation or other digital representation of data, is then generated 315 in the digital domain which includes the captured data. In an embodiment, generation 315 of the digital file also includes reformatting the captured data. In one embodiment, the digital file is then modified 320 in the digital domain, allowing the content of the digital file to be altered or enhanced. For example, text included in the digital file is modified or additional text is added to the digital file. Data included in the digital file is then printed 325, converting data from the digital domain back to the paper domain. In an embodiment, a printer 150 coupled to the computing system 120 generates a paper representation of the digital file.

Back in the paper domain, the data can be further edited 330 using the smart pen 100. For example, the user may determine that a content recognition algorithm used by the smart pen 100 or computing system 120 erroneously identified a word originally written on the paper and edit 330 the content printed 325 from the digital domain by writing on the paper, for example, by lining out the incorrect word and writing the correct word above it. This additional data can be considered an enhancement to the data printed 325 from the digital domain. Hence, data is added in the paper domain and captured by the smart pen to allow user modification of data in the paper domain.

The edited data is captured by the smart pen 100 and converted 335 back to the digital domain. For example, the smart pen transmits the edited data back to the computing system 100 which interprets the edit made in the paper domain and modifies 340 the digital file including the originally captured data. Hence, data is initially captured 305 and converted 310 from paper domain to digital domain, generating 315 a digital file including the captured data. The digital file may be printed 325 to convert the data back from digital domain to paper domain, and the data may be edited 330 in the paper domain. The edited data is then converted 335 back from paper domain to digital domain, allowing the digital file to be modified 340 so that its content reflects the edits made in the paper domain. This allows the user to switch between the paper domain and the digital domain as the user sees fit, in whatever way is most convenient for the task at hand. Converting data between digital domain and paper domain provides tremendous flexibility in the creation and enhancement of content, including multi-modal information.

Although the example shown in FIG. 3 describes data or content originally created in the paper domain, the data could just have easily been originally created in the digital domain using any of a wide variety of known techniques for creating digital content, such as using text editing software, word processing software, drawing programs or similar digital content creation techniques.

Embodiments of the invention may also include multi-person applications that take advantage of the cyclical writing and editing capabilities of those embodiments. For example, an author may write a draft of a document in the digital domain, print out a paper copy of the document and give the paper copy to an editor. The editor then adds corrections and suggestions using a combination of writing, drawing and audio recording. These corrections and suggestions can range from typographical corrections to tapping on a section of the paper copy of the document and recording a comment, such as "I think you need to strengthen this section and add some more examples." This enhanced version of the document is returned to the author who can view and/or listen to the editor's comments using a smart pen 100 or a computing system 120. The author can then implement the changes, either in the paper or digital domain, or ask clarifying questions if another around of review is to take place.

In one embodiment, the information transmitted between the digital and paper domains includes a single mode, such as writing. For example, in an editing process a user makes annotations or edits to a printout of a digital document and the annotations and/or edits are added back to the document in the digital domain. Alternatively, the information transmitted between the digital and paper domains includes multiple modes. For example, a user makes annotations or edits to a printout of the digital document and records audio data associated with one or more sections of the digital document and the annotations or edits are added back to the document in the digital domain and the sections of the digital document are associated with one or more audio files associated with the recorded audio.

In another embodiment, the smart pen computing system includes a control mechanism to allow a user to erase written content captured by the smart pen 100. This control to erase may be defined by a user in an embodiment. For example, a user draws a "delete" button with the smart pen 100 and assigns a functionality to the drawn button for erasing captured written content. Alternatively, the control to erase is predefined as a menu item accessible by the smart pen or invoked via another interaction. In one implementation, after the user has been writing with the smart pen 100, the user invokes the erase functionality and defines the region of written content to be erased. For example, the user taps the smart pen 100 on opposite corners of the written content to be erased, forming an "erase box" of data to be deleted, circling the content to be deleted or using another input to identify the written content to erase. The smart pen computing system then deletes the selected written content from its memory or otherwise identifies the selected content to not be included with the captured content. For example, the smart pen 100 does not transfer the selected content to the computing system 120 when docked with the computing system 120.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium, which include any type of tangible media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A pen-based computing system for transferring data between a paper domain and a digital domain, the system comprising:
   a smart pen device interacting with a paper representation, the paper representation containing printed textual data representing textual data of a digital file, the smart pen device configured to:
      capture written editing data, the written editing data modifying the printed textual data on the paper representation;
      recognize drawing of a delete button on the paper representation;
      recognize drawing of an erase box on the paper representation, the erase box separate from the delete button, and the erase box enclosing a subset of the printed textual data; and
      responsive to detecting that the delete button has been invoked, exclude the enclosed subset of the printed textual data from data transferred by the smart pen device to a computing device; and
   a non-transitory computer-readable storage medium containing computer program code for execution on the computing device, the computer program code containing instructions to:
      receive, from the smart pen device, the written editing data captured from the paper domain; and
      modify the digital file to generate a modified digital file in accordance with the written editing data.

2. The pen-based computing system of claim 1, wherein excluding the enclosed subset of the printed textual data from data transferred by the smart pen device to the computing device comprises:
  deleting the subset of the printed textual data from a memory of the smart pen.

3. The pen-based computing system of claim 1, wherein the digital file further comprises at least one of: image content, audio content, and video content.

4. The pen-based computing system of claim 1 wherein the smart pen further captures at least one of: image content, data or sensed motion of the smart pen.

5. The pen-based computing system of claim 1, wherein:
  the smart pen device further captures annotation data, the annotation data associated with a subset of the paper representation; and
  the computing system receives the annotation data and associates the annotation data with a subset of the digital file corresponding to the subset of the paper representation.

6. The pen-based computing system of claim 1, wherein the smart pen device is further configured to:
  capture written annotation data associated with a subset of the paper representation of the digital file; and
  associate the written annotation data with a subset of the digital file corresponding to the subset of the paper representation of the digital file.

7. A non-transitory computer-readable storage medium storing computer program code for transferring data between a paper domain and a digital domain, the computer program code when executed by a processor causes the processor to perform steps including:
  capturing data written on a first physical document using a smart pen;
  transferring the captured data from the smart pen to a computer system, the computer system storing the captured data as a digital document;
  identifying a paper representation of the digital document, the paper representation containing printed data corresponding to the captured data;
  capturing written editing data written on the paper representation using the smart pen, the written editing data modifying the printed data on the paper representation;
  capturing a gesture identifying a section of the printed data on the paper representation;
  recording an audio comment related to the identified section of the printed data on the paper representation;
  recognizing drawing of a delete button using the smart pen on the paper representation of the digital document;
  recognizing drawing of an erase box using the smart pen on the paper representation, the erase box separate from the delete button, and the erase box enclosing a subset of the printed data; and
  responsive to invoking the delete button using the smart pen, excluding the enclosed subset of the printed data from data transferred from the smart pen to the computer system;
  transferring the captured written editing data from the smart pen to the computer system, the computer system generating a modified digital document in accordance with the captured written editing data; and
  transferring the recorded audio comment from the smart pen to the computer system, the computer system storing the recorded audio comment in association with a section of the modified digital document corresponding to the identified section of the printed data on the paper representation.

8. A non-transitory computer-readable storage medium storing computer program code for transferring data between a paper domain and a digital domain, the computer program code when executed by a processor causing the processor to perform steps including:
  identifying a paper representation of a digital document, the paper representation containing printed data;
  capturing written editing data written on the paper representation using a smart pen, the written editing data modifying the printed data on the paper representation;
  recognizing drawing of a delete button using the smart pen on the paper representation;
  recognizing drawing of an erase box using the smart pen on the paper representation, the erase box separate from the delete button, and the erase box enclosing a subset of the printed data;
  responsive to invoking the delete button using the smart pen, excluding the enclosed subset of the printed data from data transferred by the smart pen to a computer system; and
  transferring the captured written editing data from the smart pen to the computer system, the computer system generating a modified digital document in accordance with the captured written editing data.

9. The non-transitory computer-readable storage medium of claim 8, wherein excluding the enclosed subset of the printed data from data transferred by the smart pen to the computer system comprises:
  deleting the subset of the printed data from a memory of the smart pen.

10. A pen-based computing system for transferring data between a paper domain and a digital domain, the system comprising:
  a smart pen device interacting with a paper representation, the paper representation containing printed textual data representing textual data of a digital file, the smart pen device configured to:
    capture written editing data, gesture data, and audio comments from the paper domain, the written editing data modifying the printed textual data on the paper representation, and the gesture data identifying a section of the printed textual data on the paper representation to be associated with each of the audio comments;
    recognize drawing of a delete button on the paper representation;
    recognize drawing of an erase box on the paper representation, the erase box separate from the delete button, and the erase box enclosing a subset of the printed textual data for deletion; and
    responsive to detecting that the delete button has been invoked, exclude the enclosed subset of the printed textual data from data transferred by the smart pen device to a computing device; and
  a non-transitory computer-readable storage medium containing computer program code for execution on the computing device, the computer program code containing instructions to:
    receive, from the smart pen device, the written editing data, the gesture data, and the audio comments captured from the paper domain;
    modify the digital file to generate a modified digital file in accordance with the written editing data; and
    store each of the audio comments in association with a section of the modified digital file corresponding to the section of the printed textual data identified by the corresponding gesture data.

* * * * *